Aug. 4, 1953                W. M. DROUT, JR                    2,647,861
              PURIFICATION OF KETONES BY DISTILLATION
Filed June 16, 1949                                         2 Sheets-Sheet 2
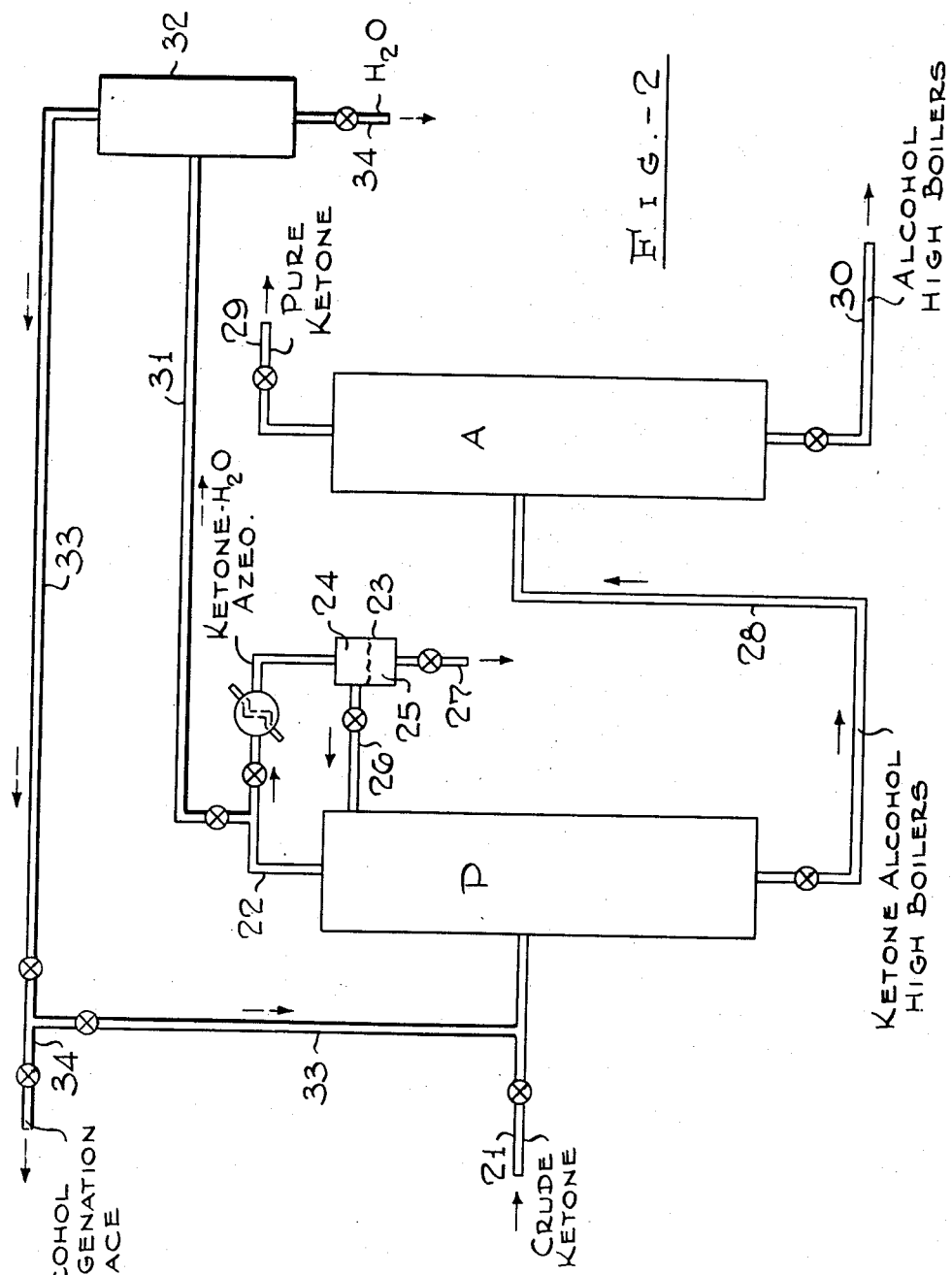
William M. Drout, Jr. Inventor
By Henry Berk Attorney Patented Aug. 4, 1953

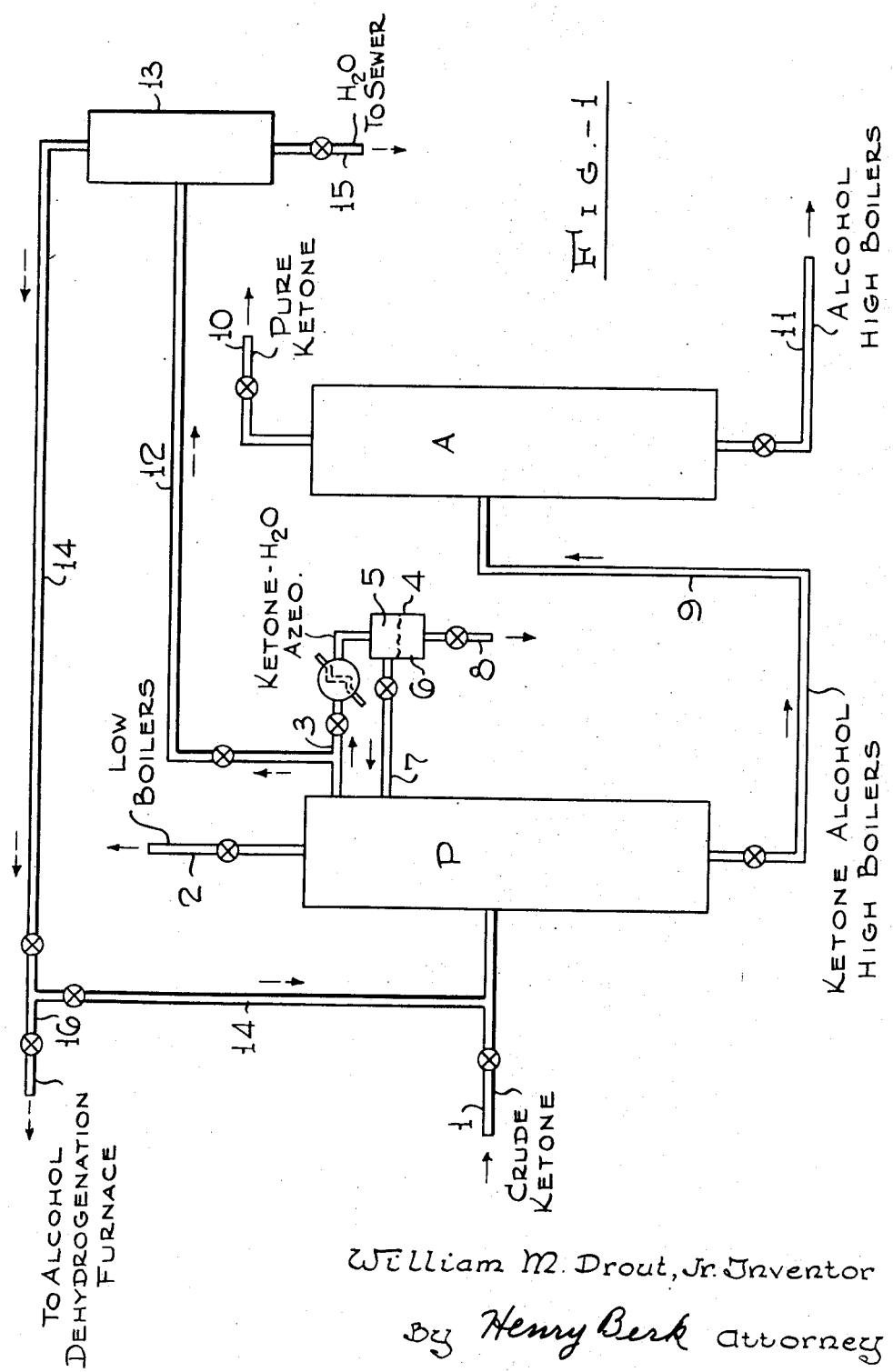

2,647,861

UNITED STATES PATENT OFFICE 2,647,861

PURIFICATION OF KETONES BY DISTILLATION

William M. Drout, Jr., Linden, N. J., assignor to Standard Oil Development Company, a corporation of Delaware Application June 16, 1949, Serial No. 99,455

2 Claims. (Cl. 202—42)

This invention relates to the dehydration and purification of methyl ketones such as methyl ethyl ketone, the methyl propyl ketones and the methyl butyl ketones such as methyl isobutyl ketone. Methyl ethyl ketone is widely used as a solvent for vinyl resins, cellulose acetate and other lacquers and surface coatings. Methyl propyl ketone and methyl isobutyl ketone also have similar wide uses. The purity of the ketone is a critical factor in its use particularly in the solvent industries. Some traces of ketone condensation products, such as for example isophorone, etc. impart highly undesirable colors and odors to resins, lacquers, etc.

At the present time ketones are prepared commercially by the dehydrogenation of the corresponding secondary alcohol. Methyl ethyl ketone is produced by the dehydrogenation of secondary butyl alcohol. The crude methyl ethyl ketone product contains water, secondary butyl alcohol, secondary butyl ether, and other impurities lower-boiling and higher-boiling than methyl ethyl ketone. Ketone purification methods employed successfully in the prior art are few. One method consists of a two-column atmospheric pressure distillation process. In the first column the unconverted secondary butyl alcohol and high-boiling impurities are removed as a bottoms stream while low-boiling impurities, water and substantially all of the ketones are recovered as a top stream. The top stream is fed to a second column where the ketone-water azeotrope and light boilers are removed as a second top stream. This top stream from the second column requires further processing for recovery of the ketones, such as treatment with salt or caustic followed by another distillation step in which the bulk of the ketone is recovered as a bottoms product. This method of purification has been used commercially for several years.

A second method is that described in U. S. 2,166,584. However, this method shows no advantage over the first method except in the presence of aldehydes which are rarely encountered in crude ketones prepared by the dehydrogenation of secondary alcohols.

Both of the above processes failed to completely remove water from the ketone product. Recently Harney and Amick in U. S. 2,454,447 have described a process for the removal of water from methyl ethyl ketone aqueous mixtures by means of distillation of the crude aqueous ketone under superatmospheric pressures. The process of this application represents an improvement in the purification and dehydration of ketones over the process of U. S. 2,454,447 which is hereby incorporated herein by reference.

Experimental data have shown that under comparatively long periods of high pressure and high temperature such as is encountered in the dehydration process of U. S. 2,454,447 methyl ethyl ketone undergoes slight decompositition resulting in the formation of higher boiling impurities. The amount of degradation products is less than approximately 0.5% and in many instances less than 0.2% to 0.3%. However these impurities even when present in such small amounts adversely affect the marketability of the ketone particularly for critical solvent purposes.

It has been found that a dry ketone of extremely high impurity can be obtained by carrying out the pressure dehydration in a first column prior to the removal from the ketone of higher boiling impurities. The dry ketone recovered as bottoms from the pressure distillation is led to a second atmospheric distillation tower in which the ketone of high purity is recovered overhead from higher-boiling alcohols, condensation products and degradation products resulting from the pressure distillation. Thus the first distillation tower which operates under superatmospheric pressure serves for the removal of water and materials lower-boiling than the ketone, while the second column operated preferably under atmospheric pressure separates the pure ketone from higher-boiling alcohols and higher-boiling condensation and degradation products.

To illustrate the invention reference is made to the accompanying drawings which represent diagrammatically in elevational view two flow plans for carrying out the process. Figure 1 illustrates the process preferably followed when impurities lower-boiling than the ketone are present, while Figure 2 illustrates the process for the purification of a ketone from which the low-boilers have already been removed.

Referring to Figure 1 the process will be illustrated by the purification of crude methyl ethyl ketone obtained by the catalytic dehydragenation of secondary butyl alcohol. The composition of the crude methyl ethyl ketone varies slightly with the type of catalyst employed in the dehydrogenation, the catalyst activity, operating conditions and impurities in the secondary butyl alcohol feed. However a typical analysis of the crude methyl ethyl ketone is as follows:

TABLE I

| | Weight percent |
|---|---|
| MEK | 79.9 |
| Acetone | 0.3 |
| Sec.-BuOH | 14.8 |
| $H_2O$ | 0.4 |
| Hydrocarbons | 0.1 |
| Sec. butyl ether | 2.5 |
| i-PrOH+t-BuOH | 0.2 |
| Higher ketones | 1.8 |

Crude ketone is fed via line 1 to distillation column P which is operated under superatmospheric pressure of at least 20 lbs./sq. in., preferably 20 to 200 lbs./sq. in. and more preferably 60 to 80 lbs./sq. in. Heat is applied to the column such as by a reboiler (not illustrated) and distillation is effected. Components of the crude ketone which boil lower than the ketone are removed via line 2 from the top of the column as a vapor stream. There is removed from the column as an upper side stream above the feed point a liquid or vapor stream, preferably a liquid stream, comprising substantially all of the water in the crude ketone in the form of the methyl ethyl ketone-water azeotrope. Under the pressure of the system the water content of the azeotrope as taught in U. S. 2,454,447 increases to such an extent that when the azeotrope stream is cooled, the azeotrope breaks into two layers. Thus the ketone-water azeotrope is removed from the column via line 3, cooled and led to decanter 4 in which the stream breaks into an upper ketone-rich layer 5 and a lower water-rich layer 6. The decanter is operated either at atmospheric pressure or under the same pressure as exists in column P since the solubility of methyl ethyl ketone in water is not affected appreciably by pressure. In order to obtain the maximum effect of phase separation the azeotrope stream is cooled to a temperature of about 20° to 60° C., preferably about 25° C. The ketone-rich layer 4 which comprises methyl ethyl ketone saturated with water is preferably returned to the pressure column via line 7 at some point not below the feed line 1. The water-rich layer 6 is removed from the system via line 8 and is preferably redistilled to the composition of the normal methyl ethyl ketone-water azeotrope, i. e. 89 weight percent MEK–11.0 weight percent water.

Although it is preferred to run the pressure azeotrope to a decanter for phase separation, it is also possible to avoid the use of the decanter and send the azeotrope, via line 12, to an atmospheric distillation tower 13 wherein the pressure azeotrope is distilled to remove overhead, via line 14, the normal ketone-water azeotrope e. g. the MEK-water azeotrope containing 11 weight percent water. The excess water is removed from the bottom of this column, via line 15, and run to the sewer. When the process is followed according to the preferred method tower 13 may be employed to concentrate water-rich layer 6 to the original ketone-water azeotrope.

During the distillation of the methyl ethyl ketone under superatmospheric pressure which method has been found most effective to completely remove water from the methyl ethyl ketone, it has been found that the methyl ethyl ketone undergoes degradation to form condensation products which are higher-boiling than the methyl ethyl ketone and which would of necessity contaminate the final methyl ethyl ketone product if they were not removed therefrom.

Thus it has been found advisable according to this invention to carry out the pressure dehydration operation prior to the removal of the impurities higher boiling than the ketone. The dry ketone therefore containing higher boiling alcohols and other higher boiling condensation and degradation products are removed from the pressure distillation vessel P via line 9 and introduced into finishing column A which is preferably operated under atmospheric pressure. In column A distillation of the ketone is brought about and the pure ketone is recovered as a vapor via line 10, condensed and sent to storage without any purification. The other higher boiling condensation products, etc., are removed from the system via line 11.

In some cases it has been found advisable to remove materials lower boiling than the ketone prior to the pressure distillation operation. In such event the process is carried out according to the flow plan outlined in Figure 2. Referring to Figure 2 it will be seen that the process is identical with that of Figure 1 with the exception that there is no overhead removal of low boiling materials. Instead the ketone-water azeotrope is removed overhead as a vapor stream, condensed and cooled and led to decanter 23. From this point on the process is identical with that outlined for Figure 1.

The following data in Table II illustrate the degradation of methyl ethyl ketone under the temperatures and pressures required to bring about the necessary dehydration. The data show that the color of the ketone decreases indicating degradation of the methyl ethyl ketone. The data also reflect an increase in the ASTM Dry Point indicating the presence of materials higher boiling than the ketone. It has also been observed that stainless steel has an initial catalytic effect in degrading methyl ethyl ketone but after 6 to 8 hours the steel apparently conditions itself and has no further effect on ketone quality. The free acidity of the ketone has also been found to increase during the pressure distillation. The reason for this phenomenon is not exactly clear. In the case of stainless steel oxidation of the ketone could possibly be promoted by the presence on the surface of the steel of metallic oxides employed in the finishing of the steel. With the glass surface no plausible explanation is available. Although the data indicate that the degradation as shown in the table took place when the methyl ethyl ketone was under the temperature and pressure of the distillation for a period of 3 hours it has also been found that degradation occurs with lower distillation hold-up times such as 45 minutes. These lower hold-up times are such as are employed in the actual commercial distillation of the ketone.

TABLE II

| Run # | Pressure | Temp. | Color | Free Acidity | ASTM Dry Point | Materials Present | Time Under Press. and Temp. |
|---|---|---|---|---|---|---|---|
| Original MEK | | Room | +25 | neut | 79.8 | Glass | |
| 4 | 80 | 138.6° C | +21 | 0.02 | 79.9 | do | 3 hrs. |
| 1 | 80 | 138.6° C | +15 | 0.027 | 81.0 | Glass and Stainless Steel Chips. | Do. |
| 2 | 80 | 138° C | +20 | 0.021 | 80.8 | do | Do. |
| 3 | 80 | 138° C | +21 | 0.013 | 79.9 | do | Do. |

The data in Table III illustrates the effect of increased distillation pressure on the water content of the methyl ethyl ketone-water azeotrope. The data show a continual increase in water content of the azeotrope as the pressure is increased from 0 to 60 p. s. i. g.

TABLE III

| Pressure p. s. i. g. | Temp., °C. | Wt. Percent H₂O in MEK Azeotrope |
|---|---|---|
| 0 | 73.4 | 11.0 (homogeneous). |
| 3.5 | 79.3 | 12.1 (cloudy). |
| 9.2 | 88.0 | 12.5 (di-phase). |
| 30.0 | 111 | 15.8 (di-phase). |
| 60.0 | 125 | 18.3 (di-phase). |

Isopropanol and t-butyl alcohol form ternary azeotropes with MEK and H₂O which boil within a few tenths of a degree of the MEK-H₂O azeotrope. Thus, these impurities if present would appear in the MEK-H₂O side stream. Depending upon the concentration of the alcohols in the crude feed, one of two methods can be used.

(A). *Very low concentrations of isopropanol and/or t-butyl alcohol*

The MEK-H₂O azeotrope from the pressure column would be led to a decanter for phase separation. The bulk of the isopropanol and/or t-butyl alcohol would appear in the water-rich phase which would be removed from the system for further treating. For example, the water-rich phase could be dehydrated by conventional distillation and salt or caustic dehydration. The resulting relatively dry ketone containing the alcohols could be recycled via lines 14 and 16 back to the alcohol dehydrogenation furnace where the t-butyl alcohol is converted to isobutylene and the isopropanol is converted to acetone. Isobutylene and acetone are readily removable from methyl ethyl ketone.

(B). *Higher concentrations of isopropanol and/or t-butyl alcohol (5% and above)*

All or part of the MEK-H₂O azeotrope containing isopropanol and/or t-butyl alcohol would be led to an atmospheric distillation column 13 or to a caustic or salt dehydration unit for dehydration to not more than 11% water. Phase separation of the MEK-H₂O azeotrope can not be obtained if the concentration of the alcohols in the azeotrope is over 5–6%. The normal ketone-water azeotrope plus isopropanol and/or t-butyl alcohol after dehydration may be recycled, via lines 14 and 16, back to the alcohol dehydrogenation furnace for converting the tertiary butanol to isobutylene and the isopropanol to acetone. The relatively dry normal ketone-water azeotrope containing the alcohols can also be further dehydrated for special uses as a non-critical solvent.

In carrying out the process according to Figure 1 substantially pure acetone with little or no water is recovered from the top of the pressure distillation column P. The amount of water removed is the function of the fractionation efficiency and the pressure employed. Extremely pure methyl ethyl ketone is recovered from the top of the second column A. The ketone contains no colored high-boiling products. If the second column were operated under superatmospheric pressure and the ketone was obtained as a bottoms stream colored high-boiling condensation products appear in the ketone product which seriously affect the marketability of the ketone.

Although the process has been illustrated with reference to the purification of methyl ethyl ketone, the system is equally adaptable to the purification of the methyl propyl ketones and the methyl butyl ketones such as methyl isobutyl ketone. Other higher ketones do not absorb sufficient water to lend themselves to purification by this process. Lower ketones such as acetone either do not form azeotropes with water or if azeotropes are formed do not lend themselves to adequate phase separation when the azeotrope is cooled. Numerous modifications of the systems described and illustrated will be apparent to those skilled in the art without departing from the spirit of this invention.

What is claimed is:

1. A process for producing a pure dry ketone from an aqueous ketone selected from the group consisting of methyl ethyl ketone, methyl propyl ketones and methyl butyl ketones and containing higher boiling impurities including the alcohol impurity, which comprises feeding the aqueous ketone to a first distillation zone, distilling the aqueous ketone in said first distillation zone at a pressure of about 20–200 p. s. i. absolute resulting in the formation of high-boiling degradation products, withdrawing from said first distillation zone at a point above the aqueous ketone feed-point a ketone-water azeotrope stream containing more water than the atmospheric azeotrope, passing the withdrawn stream to a fractionation zone, distilling the withdrawn stream in the fractionation zone at atmospheric pressure to remove overhead therefrom the ketone-water atmospheric azeotrope, removing the excess water as bottoms from the fractionation zone, returning the ketone-water atmospheric azeotrope to the first distillation zone, withdrawing from the bottom of the first distillation zone dry ketone containing higher boiling impurities including the alcohol impurity and higher boiling degradation products resulting from the pressure distillation, and separating pure dry ketone from the higher boiling impurities including the alcohol impurity and degradation products in a second distillation zone.

2. A process according to claim 1 in which the ketone is methyl ethyl ketone and in which the pressure in the first distillation zone is 60 to 80 p. s. i. absolute.

WILLIAM M. DROUT, JR.

References Cited in the file of this patent

UNITED STATES PATENTS

| Number | Name | Date |
|---|---|---|
| 1,676,700 | Lewis | July 10, 1928 |
| 1,915,002 | Ricard et al. | June 20, 1933 |
| 2,392,534 | Von Keussler | Jan. 8, 1946 |
| 2,434,447 | Harney et al. | Nov. 23, 1948 |